United States Patent [19]
Whipple, III et al.

[11] Patent Number: 5,600,310
[45] Date of Patent: Feb. 4, 1997

[54] SERIAL BUS CONTROL FOR APPLIANCES

[75] Inventors: Walter Whipple, III, Amsterdam; Hunt A. Sutherland, Saratoga Springs, both of N.Y.

[73] Assignee: General Electric Company, Schenectady, N.Y.

[21] Appl. No.: 348,408

[22] Filed: Dec. 2, 1994

[51] Int. Cl.$^6$ .................................................. H04L 12/40
[52] U.S. Cl. .................... 340/825.06; 307/11; 315/312; 340/310.06; 340/825.04; 340/825.22
[58] Field of Search ................ 340/825.32, 825.52, 340/825.53, 825.06, 825.07, 825.08, 825.69, 825.72, 825.04, 825.22, 310.06, 310.08, 310.01, 310 CP; 315/291, 312, 313; 307/11

[56] References Cited

U.S. PATENT DOCUMENTS

| | | | |
|---|---|---|---|
| 4,540,890 | 9/1985 | Gangemi et al. | 307/40 |
| 4,703,306 | 10/1987 | Barritt | 340/310.08 |
| 4,808,841 | 2/1989 | Ito et al. | 340/310.01 X |
| 4,899,131 | 2/1990 | Wilk et al. | 340/825.06 X |
| 5,237,305 | 8/1993 | Ishikuro et al. | 340/310.01 X |
| 5,237,322 | 8/1993 | Heberle | 340/825.52 X |
| 5,306,995 | 4/1994 | Payne et al. | 318/561 |
| 5,331,619 | 7/1994 | Barnum et al. | 364/132 |
| 5,352,957 | 10/1994 | Werner | 340/310.06 X |

FOREIGN PATENT DOCUMENTS

| | | |
|---|---|---|
| 0586715 | 3/1994 | European Pat. Off. |
| 0610907 | 8/1994 | European Pat. Off. |
| 3342301 | 5/1985 | Germany |
| 9203881 | 3/1992 | WIPO |
| 9424618 | 10/1994 | WIPO |

OTHER PUBLICATIONS

George Hanover, Networking The Intelligent Home, (IEEE Spectrum, Oct. 1989), pp. 48–49.

Primary Examiner—Brian Zimmerman
Assistant Examiner—William H. Wilson, Jr.
Attorney, Agent, or Firm—Donald S. Ingraham

[57] ABSTRACT

A household appliance having a serial bus control system includes a system controller, a plurality of slave nodes, and a serial bus connector. Each slave node is a sensor, an actuator, or the like, that is coupled to the serial bus connector and is responsive to a particular slave node address code generated by a master communications module that is part of the system controller. The serial bus connector is a loop of conductor which is attached at each end of the loop to the master communication module, with the slave nodes coupled to the loop at intermediate positions along the loop. The master communications module includes an interrogation circuit for generating digital transmissions to one or more of said slave node address codes and a receiver circuit for receipt of digital transmissions from the slave nodes coupled to said serial bus connector. The system controller further includes a processor for receiving sensor signals from slave nodes addressed by the communications module and for generating respective control signals to govern operation of actuators coupled to the serial bus connector.

14 Claims, 1 Drawing Sheet

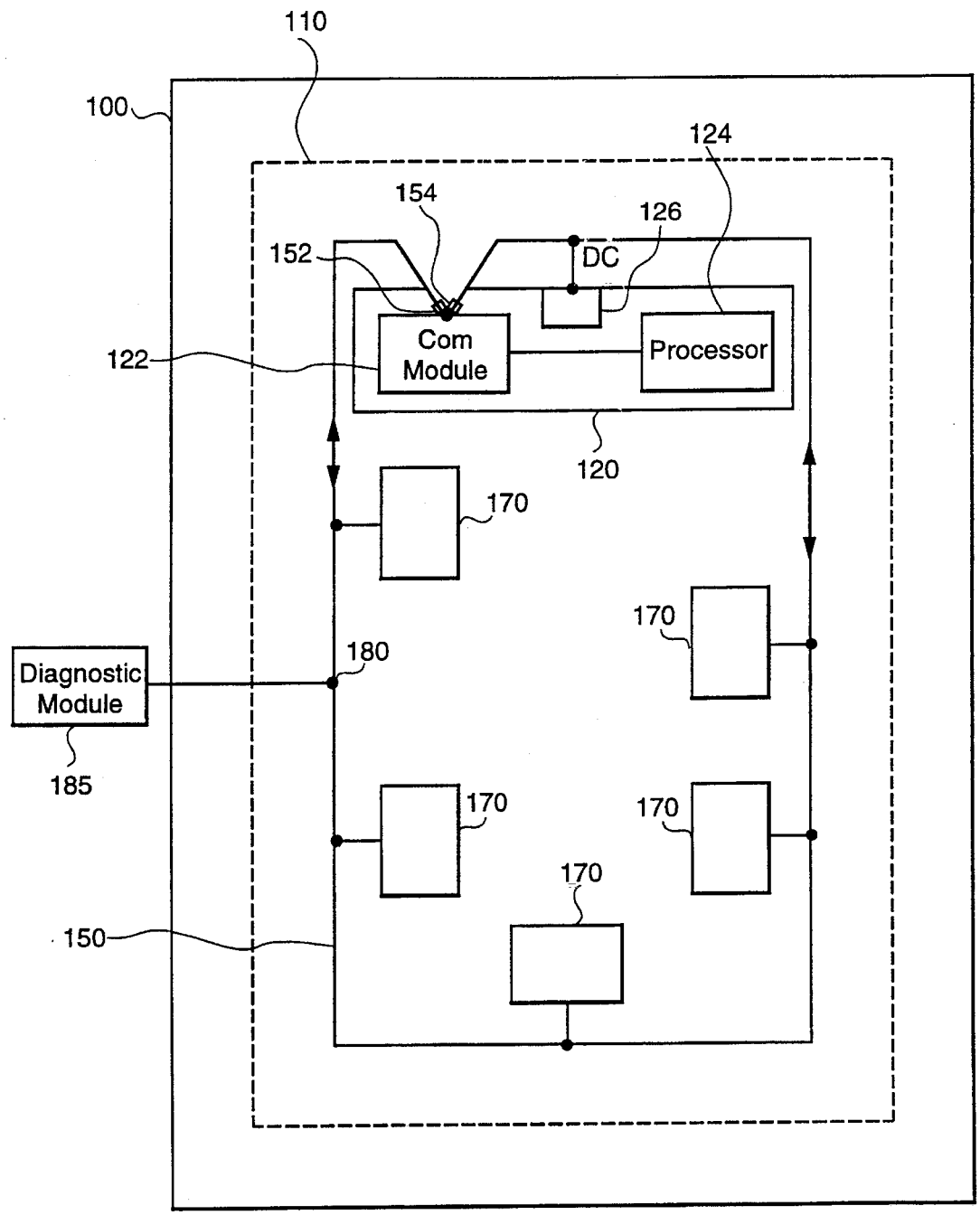

5,600,310

SERIAL BUS CONTROL FOR APPLIANCES

BACKGROUND OF THE INVENTION

Household appliances are becoming increasingly complex as efforts are made to improve the efficiency and operational capabilities of the appliance. As used herein, "household appliances" refers to devices such as clothes washers, clothes dryers, dishwashers, cooking ranges, microwave ovens, and refrigerators that have electrical control of at least some functions of the device. Such household devices are typically independent units such that they can be fabricated and said independently of the building structure in which they are to be used.

Improved appliance efficiency is desired in order to reduce energy consumption (such as the electrical power to operate a refrigerator, clothes dryer, cooking range, or the like) and other resource consumption, such as reduction of water consumption in clothes washers and dishwashers, Electronic control of appliances has been used to improve efficiency through the use of sensors to monitor appliance performance and to provide data to adjust the appliance operating components to function in accordance with a desired operating profile (e.g., temperature sensors to improve refrigeration system operation, or water sensors to detect water cleanliness in dishwashers).

Conventional appliance manufacturing techniques have involved the routing of electrical wiring between a power supply (such as a junction attached to the power cord) and respective elements in the appliance that required the power. Most appliances with electronic control systems have included similar wiring arrangements, that is, direct connections between the appliance controller and the disparate sensors and actuators, resulting in a "star" type of wiring arrangement. All of the wiring in such systems has typically been relatively heavy gage (e.g., 18 gage or heavier) because the systems commonly rely on analog communication, with attendant higher voltage or current requirements, and for reasons of ease of fabrication (the wiring must withstand the many manipulations necessary to route it through the appliance in the assembly-line environment). As the sophistication of the control system (e.g., dependent on the number of options selected by the consumer on a particular appliance, and on the sensors and systems used to enhance energy and resource efficiency) increases, the amount of wiring and the time to install the wiring increases.

Such assembly techniques present difficulties with regard to resources used in production, such as the wiring to connect each sensor or actuator to the controller, the time to install the wiring, and the necessity of having unique wiring protocols for each appliance with different options or configurations. Further, as the number of wire interconnects increases, there is an increased probability of failure of some portion of the wiring for appliance control system.

In a household appliance it is desirable to reduce the total amount of wiring used for control system sensors and actuators as much as feasible while retaining operational reliability. Fabrication efficiency is also enhanced to the degree that standard wiring protocols can be used for a wide range of products.

SUMMARY OF THE INVENTION

In accordance with this invention, a household appliance includes a serial bus control system that comprises a master communications module, a plurality of slave nodes, and a serial bus connector. Slave nodes comprise a sensor, an actuator, or the like, that is coupled to the serial bus connector and is responsive to a selected slave node address code generated by the master communications module. The serial bus connector typically comprises a loop of conductor which is attached at each end of the loop to the master communication module, with the slave nodes coupled to the loop at intermediate positions along the loop. The master communications module includes an interrogation circuit for generating digital transmissions to one or more of said slave node address codes and a receiver circuit for receipt of digital transmissions from said slave nodes coupled to the serial bus connector.

The serial bus control system typically also includes a system controller, of which the master communications module is a part. The system controller further includes a processor for receiving sensor signals from slave nodes addressed by the communications module and for generating respective control signals to govern operation of actuators coupled to the serial bus connector.

The serial bus connector may include both a communications bus for passage of digital communication signals between the master communication module and respective slave nodes, and a power bus for providing electrical power to the slave nodes and their related components.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawing in which the Figure is a block diagram of an appliance serial bus control system in accordance with this invention.

DETAILED DESCRIPTION OF THE INVENTION

In accordance with this invention, a household appliance (as defined above) 100 comprises a serial bus control system 110 (outlined in phantom) employing a master-slave communications modality. The serial bus control system comprises a system controller 120, a plurality of slave nodes 170, and a serial bus connector (or cable) 150 to which the system controller 120 and each respective slave node 170 is electrically coupled. System controller 120 comprises a master communications module 122 and typically further comprises a processor 124 (both of which may be contained in one chip or microprocessor device); communications module 122 controls communications on serial bus connector 150. Slave nodes 170 comprise devices such as sensors (e.g., to determine the condition or state of a measured parameter), actuators (e.g., to operate mechanical, electrical, hydraulic, or pneumatic components), or the like.

As used herein, "serial bus" refers to a communications system in which each component is respectively coupled to the same bus such that communications to or from each slave node is passed along the same bus, each slave node being accessed by an address code. Use of the same bus (that is, the same wire or set of wires) to communicate with each respective slave node obviates the need for wiring each node directly to the controller with a respective wire (or set of wires). "Master-slave" or similar terminology as used herein refers to a control system in which all communications to respective slave nodes is initiated by the master communications module, that is, each slave node generates signals on the serial communications bus only in response to an inquiry from the master communications module. Such a "master-slave" system is distinct from peer-to-peer or "token-ring" type control systems in which more than one node can initiate communications or act on or modify communications of other nodes, thus enabling communication between nodes, whereas in the master-slave system slave nodes only communicate with the master communications module upon request from the master.

In the typical appliance control system, controller 120 is adapted to sense the condition of the appliance and generate control signals to components of the appliance to result in a desired operating regime, such as to optimize energy efficiency or the like. Communications between controller 120 and each respective slave node 170 pass through master communications module 122. Master communications module 122 typically comprises circuits adapted for digital communication with one or more sensors and actuators, such as an interrogation circuit for generating digital address code signals to access selected slave nodes and a receiver circuit for passing transmissions received from the slave nodes to processor 124. One example of a master communications module is a microcontroller (or microprocessor) such as an Intell 8051 series chip or the like. Each slave node 170 has a digital address code; when this master communications module transmits this address, communications between controller 120 and the slave node are established. After communications between a slave node and the master communications module have been established, control signals from processor circuit 124 are directed to the node to command response to an inquiry, such as reporting a sensed parameter, a user input, or the like. Typically slave nodes have respective addresses, although in some arrangements multiple slave nodes may have a common address, that is one address code transmitted from the master communications module causes each of a plurality of slave nodes to respond, such as a command directed to turn components on or off; such as multiple lights in a compartment.

Processor 124 of controller 120 is adapted to receive data signals transmitted from slave node (via master communications module 122) and generate control signals for actuators and the like to control appliance operation. Processor 124 typically further comprises a clock circuit for coordinating the exchange of data in the control system. Processor 124 further comprises various applications (or programs) on the microprocessor chip that selectively control the rate of updating information from the slave nodes. Variable sampling rates (e.g., collection of data from the various nodes) are used for different modes of appliance operation. For example, fairly long periods for updating information are appropriate when an appliance such as a dishwasher or oven range is not in use, whereas a shorter period is appropriate when the appliance is in use. Similarly, the update period in a refrigerator would be shorter after a compartment door has been opened until the refrigerator compartments have been returned to equilibrium. In the typical appliance environment, even the maximum speed of updating information in controller 120 can be relatively slow (that is, an update periodicity on the order of magnitude of seconds), thus reducing the complexity and cost of the controller circuitry. For example, the baud rate of controller 120 can be in the range of about 50 baud to 10,000 baud, with typical values of about 200 to 1000 baud.

Further, controller 120 and slave nodes 170 comprise power down control circuitry to reduce energy consumption during periods when the appliance is idle or the like. For example, the power down circuitry typically slows the update periodicity of controller and power is shut off to unused peripherals, such as interior display modules or temperature sensors during periods the appliance is not in use. In addition, controller 120 comprises applications so that slave nodes comprising actuators for appliance control typically shut off if the actuator has not been addressed by the master communications module within a predetermined time so that the appliance is operated in a "fail-safe" mode. By way of example and not limitation, heating elements in a stove would be deenergized if not addressed by control system 120 within a prescribed time (e.g., 1–3 minutes). In essence such a safety system "strobes" or periodically commands a particular performance from a component; in the absence of such input, the component is placed in a fail-safe condition.

Serial bus connector (or cable) 150 typically comprises one or more electrically conductive wires that are arranged in a loop in appliance 100. Bus connector 150 is disposed in appliance 100 in an arrangement whereby the various slave nodes 170 in appliance 100 can be readily electrically coupled to the bus wires such that two-way communication can occur between master communications module 122 and one or more slave nodes. Serial bus connector comprises a communications bus (not separately shown) that has a first end 152 and a second end 154; typically, each end is respectively coupled to master communication module 122; such an arrangement provides optimal reliability for providing communications to attached slave nodes in the event of an open circuit condition somewhere along the communications bus. Alternatively, serial bus connector 150 can be disposed such that only one end of the bus is coupled to command module 122; in such an arrangement, the amount of wire needed for serial bus connector 150 can be reduced as the wire need not be routed through the appliance to return to command module 122.

Serial bus connector 150 typically comprises at least two wires, with one wire providing a power source (such as a direct-current (DC) source) to slave node components that require such, and one wire providing a bi-directional communications path. In this arrangement, the appliance frame can be used as the low-voltage (DC) power supply return. Commonly, however, serial bus connector comprises three (or more, as discussed above) wires, with the third wire providing the DC power return line for the slave nodes. The DC power supply wires of serial bus connector 150 are coupled to a DC power supply 126. Additional wires (beyond 3) in serial bus connector 150 can be used for redundant communications ability and synchronizing signals for master communication module to coordinate transmission of responses from respective slave nodes 170.

In another embodiment of the present invention, serial bus connector 150 further comprises alternating current power supply wires such that all electrical wiring (control and communications and power supply) in the appliance is run with a common cable and wiring harnesses. Alternatively, the AC electrical power supply to appliance components (such as motors, pumps, compressors, and the like) is wired independently of serial bus connector 150, as in conventional appliances.

Slave nodes 170 comprise sensors, actuators, or combination type devices. Examples of common slave node sensors include temperature sensors (e.g., compartment temperature in a refrigerator, or oven temperature in a stove); pressure sensors (e.g., refrigerant pressure in a refrigeration system); ambient condition sensors (e.g., temperature and humidity); turbidity sensors (e.g., for measuring the "cleanliness" waste water in dishwashers and clothes washers);

motor load sensors; mechanical component position sensors (e.g., door open or closed); and the like. Examples of actuators includes control relays for starting motors; drive motors for components such as dampers in a refrigerator; lighting elements in an appliance; and the like. Examples of combination sensor/actuator devices include damper drive motors (or evaporator fan control actuators) that also indicate damper position, and environmental sensors (temperature or humidity) coupled to fan speed sensors. Slave nodes 170 advantageously are readily coupled to serial bus connector 150, such as by clamping on to the serial bus wires, so that fabrication of appliances with a variety of features (e.g., various sensors and actuators as might be found in different models) is efficiently accomplished during manufacture. This capability also facilitates late point identification in the manufacturing process to provide flexibility in the manufacturing process. Further, the control system in accordance with this invention is well adapted to the addition of consumer added options after purchase.

Serial bus connector 150 advantageously also comprises a coupling point 180 for an external diagnostics module 185. Such a diagnostics module 185 can be used by service personnel to check on control system operation and appliance condition for the purposes of analyzing and diagnosing items in need of repair. Diagnostics module 185 can generate command (e.g., data transmit orders) signals directly to slave nodes 170 (e.g., control is passed to the diagnostics module), or alternatively, generate control signals to master communications module to generate the desired command signals for accessing the desired slave nodes (wherein master communications module serves as an intermediary server).

By way of example and not limitation, serial bus control system 110 in accordance with this invention can be used in appliances as follows. In an electric range, for example, control system 110 can be used to reduce the number of conductors at the AC line potential; user inputs (e.g., temperature selection for burners and oven) are via the low voltage DC control circuit described above that are processed by controller 120 to generate low voltage DC control signals for actuators that command the respective heating elements on or off, or alternatively, command an actuator to set the oven temperature. Appliance control displays (e.g., set temperature, actual temperature, and the like) are readily generated by serial bus control system 110 in accordance with this invention.

By way of further example, a clothes washer comprising serial bus control system 110 provides for user inputs to control water temperature and corresponding actuators (for hot and cold water) to control the water supply to provide the desired temperature and water level in the washer. Further, water "cleanliness" sensors (such as turbidity sensors or the like) can be used to determine the length of wash cycles, timing for addition of detergent, and the like. Other sensors, such as out-of-balance sensor, speed sensors, and the like can similarly provide input for machine control.

In a refrigerator, a three-wire serial bus connector 150 is disposed in the refrigerator to all locations that can support options or features that might be provided for the refrigerator. Dependent on the options added to the refrigerator, appropriate sensors and actuators are coupled to the serial bus connector and hence to the control system. For example, appropriate temperature sensors for respective compartments and ambient conditions provide input for energy-efficient control of the refrigeration system. (e.g., operation for optimized cooling of freezer, fresh food, quick freeze, vegetable and meat, or ice making compartments). AC high voltage wiring can be limited to compartment lighting and the compressor compartment, thus reducing thermal losses in the refrigerator created by the large number of copper conductors passing through the refrigerator's thermal insulation system. Customer options and controls necessary for energy efficient operation of the refrigerator necessitate many wires, so it is advantageous to minimize the size of wire needed to perform the necessary functions and to minimize heat loss.

Serial bus control system 110 further is readily adapted to provide a "self-configuring" capability. In such a system, processor 124 typically is programmed to provide control for one or more appliance models (e.g., refrigerators having varying options, such as ice makers, different interior compartments, or the like) or different type of appliances (e.g., cooking ranges and clothes dryers). Upon application of power to control system 110 (initially, or following an idle time), processor 124 causes communication module 122 to conduct an "inventory" of slave nodes 170 coupled to the system and their respective address codes. Based upon the slave node configuration (e.g., temperature sensors of a particular type or range at a particular address) of appliance 100, processor 124 can determine the type and model of appliance and select and implement an appropriate control algorithm from its stored memory. Such a self configuring feature further enhances the interchangeability of parts, reducing production costs and production time.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A household appliance comprising a direct current (DC) serial bus control system disposed within said appliance, said serial bus control system comprising a single DC master communications module, a low-voltage DC serial bus connector coupled to said master communication module, and a plurality of slave nodes, each of said slave nodes being coupled to said serial bus connector and being responsive to at least one of a plurality of DC current slave node address codes so as to generate a respective DC current slave node response signal to said master communications module.

2. The household appliance of claim 1 wherein said plurality of slave nodes comprise devices selected from the group including appliance control sensors, appliance control actuators, and combinations thereof.

3. The household appliance of claim 2 wherein said communications module comprises an interrogation circuit for generating digital transmissions to one or more of said slave node address codes and a receiver circuit for receipt of digital transmissions generated by said slave nodes coupled to said serial bus connector.

4. The household appliance of claim 3 wherein at least two of said slave nodes comprise different respective slave node address codes.

5. The household appliance of claim 3 wherein at least two of said slave nodes comprise the same slave node address code.

6. The household appliance of claim 3 wherein said master communications module further is adapted to generate control signals to direct operation of actuators in correspondence with data received from slave nodes coupled to said serial bus connector and processed in said appliance controller.

7. The household appliance of claim 1 wherein said appliance comprises a device selected from the group consisting of clothes washers, clothes dryers, dishwashers, stand-alone refrigerators, cooking ranges, microwave ovens, and room air conditioning units.

8. A household appliance comprising a direct current (DC) serial bus control system disposed within said appliance, said serial bus control system comprising:

a system controller, said system controller further comprising a single DC master communications module having an interrogation circuit and a receiver circuit;

a low voltage DC serial bus connector coupled to said master communication module; and a plurality of slave nodes coupled to said serial bus connector, at least one of said slave nodes comprising an actuator and at least one of said slave nodes comprising a non-actuator sensor;

each of said slave nodes having an address code such that respective ones of said slave nodes are responsive to DC digital transmissions from said master communications module to selected slave nodes coupled to said serial bus connector.

9. The household appliance of claim 8 wherein said system controller further comprises a processor for receiving sensor signals from slave nodes addressed by said master communication module and for generating respective control signals to govern operation of actuators coupled to said serial bus connector.

10. The household appliance of claim 9 wherein said serial bus connector comprises a loop having a first end and a second end, both said first and second ends being coupled to said master communications module.

11. The household appliance of claim 9 wherein one of said slave node comprises a diagnostics module connector adapted for coupling a diagnostics processor to said serial bus control system.

12. The household appliance of claim 9 wherein said system processor for receiving sensor signals from slave nodes comprises a self-configuring processor such that in an initializing cycle it inventories sensors and actuators coupled to said serial bus connector and selects an appliance control program in correspondence with the available sensors and actuators.

13. The household appliance of claim 8 wherein said serial connector bus comprises a communications bus for coupling signals between said master communications module and each of said slave nodes and a power bus for providing electrical power to at least one of said slave nodes.

14. The household appliance of claim 8 wherein said system controller has a throughput rate in the range between 50 baud and 10,000 baud.

* * * * *